(12) United States Patent
Lortie

(10) Patent No.: US 12,118,711 B2
(45) Date of Patent: Oct. 15, 2024

(54) IMAGE(S) TO LENGTH CONVERSION SYSTEMS AND METHODS

(71) Applicant: ContiTech Transportbandsysteme GmbH, Hannover (DE)

(72) Inventor: Michel Lortie, Quebec (CA)

(73) Assignee: ContiTech Transportbandsysteme GmbH, Hannover (DE)

( * ) Notice: Subject to any disclaimer, the term of this patent is extended or adjusted under 35 U.S.C. 154(b) by 338 days.

(21) Appl. No.: 17/451,035

(22) Filed: Oct. 15, 2021

(65) Prior Publication Data

US 2023/0122195 A1 Apr. 20, 2023

(51) Int. Cl.
*G06T 7/00* (2017.01)
*B65G 43/02* (2006.01)
*G01B 11/04* (2006.01)
*G01L 5/105* (2020.01)
(Continued)

(52) U.S. Cl.
CPC .............. *G06T 7/001* (2013.01); *B65G 43/02* (2013.01); *G01B 11/043* (2013.01); *G01L 5/105* (2013.01);
(Continued)

(58) Field of Classification Search
CPC ......... G06T 7/001; G06T 1/0007; G06T 7/62; G06T 2207/10048; G06T 2207/30164;
(Continued)

(56) References Cited

U.S. PATENT DOCUMENTS 5,949,531 A 9/1999 Ehbets et al.
8,755,589 B2 6/2014 Sobczak et al.
(Continued)

FOREIGN PATENT DOCUMENTS

CN 111252497 A 6/2020
CN 111392368 A 7/2020
(Continued)

OTHER PUBLICATIONS

International Search Report dated Jan. 3, 2023 of Internation Application PCT/EP2022/078696 which claimed this application.

*Primary Examiner* — Diane D Mizrahi
(74) *Attorney, Agent, or Firm* — Gregory Adams; Richard Wolf

(57) ABSTRACT

A measurement system includes an imaging device, a memory device, an interface and circuitry. The imaging device is configured to obtain a device image a conveyor belt system. The image device is configured to obtain a reference image of a reference point or reference measurement. The reference image can also be the device image. The memory device is configured to store the device image. The interface is configured to facilitate selection of points for a device/part to be measured. The circuitry comprises one or more processors configured to determine a reference measurement for the reference dimension based on the reference image via the interface; determine one or more device measurements based on the device image and the reference measurement; and calculate a plurality of device parameters based on the determined one or more device measurements. User input via a touch sensitive screen comprising a glass insulator coated with indium tin oxide (ITO) and the one or more processors can be configured to select the one or more device points based on change in capacitance at one or more locations of the touch sensitive screen.

18 Claims, 5 Drawing Sheets

(51) Int. Cl.
*G01P 3/38* (2006.01)
*G06F 3/044* (2006.01)
*G06F 3/0481* (2022.01)
*G06F 3/0488* (2022.01)
*G06T 1/00* (2006.01)
*G06T 7/62* (2017.01)

(52) U.S. Cl.
CPC ............... *G01P 3/38* (2013.01); *G06F 3/044* (2013.01); *G06F 3/0481* (2013.01); *G06F 3/0488* (2013.01); *G06T 1/0007* (2013.01); *G06T 7/62* (2017.01); *G06T 2207/10048* (2013.01); *G06T 2207/30164* (2013.01)

(58) Field of Classification Search
CPC ....... B65G 43/02; G01B 11/043; G01L 5/105; G01P 3/38; G06F 3/044; G06F 3/0481; G06F 3/0488
See application file for complete search history.

(56) References Cited

U.S. PATENT DOCUMENTS

| | | | |
|---|---|---|---|
| 9,927,222 | B2 | 3/2018 | Suzuki et al. |
| 10,046,918 | B2 | 8/2018 | Da Silva et al. |
| 10,088,759 | B2 | 10/2018 | Shibazaki |
| 10,172,225 | B2 | 1/2019 | Suzuki et al. |
| 10,222,708 | B2 | 3/2019 | Yasuda et al. |
| 2007/0145308 | A1 | 6/2007 | Kemp |
| 2018/0208405 | A1 | 7/2018 | Turck |
| 2018/0339865 | A1 | 11/2018 | Schroader |
| 2021/0088637 | A1* | 3/2021 | Mitchell ............... G01S 7/521 |

FOREIGN PATENT DOCUMENTS

| | | |
|---|---|---|
| JP | 2020027095 A | 2/2020 |
| JP | 2020200164 A | 12/2020 |

* cited by examiner

Scenario 1:
Lines Are Perfectly Superimposed
Perfect Alignment

Scenario 2:
Lines Are Parallel Linear
Misalignment

Scenario 3:
Lines Are Crossing Angular
Misalignment

*800*

IFS Measurements

*900*

IMAGE(S) TO LENGTH CONVERSION SYSTEMS AND METHODS

FIELD

The disclosure generally relates to systems and methods for analyzing and determining measurements for various applications, including conveyor belt pulley or drum rotation.

BACKGROUND

Conveyor belts are devices commonly used to transport material or articles from one location to another. Conveyor belts are used in mining applications, assembly lines and the like.

Conveyor belts are one component of a conveyor belt system. The system also includes two or more pulleys/drums where the conveyor belt wraps around the pulleys. The conveyor belt rotates about the pulleys. At least one of the pulleys is powered, also referred to as a drive pulley, and causes the conveyor belt to move and rotate about the pulleys.

As the conveyor belt moves, it conveys or carries a medium from one location to another.

Measurements of conveyor belt systems may be needed to identify damage, proper operation and the like.

Techniques to obtain these measurements typically require shutting down operation of the conveyor belt, removing access panels and physically measuring various components or features.

However, these techniques are time consuming, require shutting downs the system and the like.

What is needed are improved techniques to measure characteristics of conveyor belt systems and the like.

DETAILED DESCRIPTION

Figure 1:
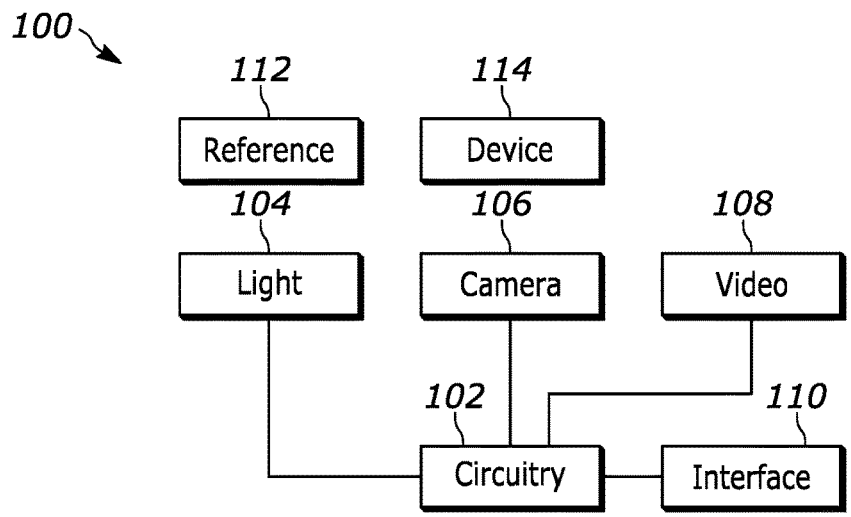
FIG. 1 is a diagram illustrating a measurement system 100 in accordance with one or more embodiments.

The following description of the variations is merely illustrative in nature and is in no way intended to limit the scope of the disclosure, its application, or uses. The description is presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Conveyor belts are devices commonly used to transport material or articles from one location to another. Conveyor belts are used in mining applications, assembly lines and the like.

Conveyor belts are one component of a conveyor belt system. The system also includes two or more pulleys/drums where the conveyor belt wraps around the pulleys. The conveyor belt rotates about the pulleys. At least one of the pulleys is powered, also referred to as a drive pulley, and causes the conveyor belt to move and rotate about the pulleys.

As the conveyor belt moves, it conveys or carries a medium from one location to another.

Measurements of conveyor belt systems may be needed to identify damage, proper operation and the like.

Techniques to obtain these measurements typically require shutting down operation of the conveyor belt, removing access panels and physically measuring various components or features.

However, these techniques are time consuming, require shutting downs the system and the like.

What is needed are improved techniques to measure characteristics of conveyor belt systems.

One or more embodiments are disclosed that derive one or more measurements of a conveyor system using image(s) and then determine conveyor system parameters without halting operations, requiring physical measurements and the like.

FIG. 1 is a diagram illustrating a measurement system 100 in accordance with one or more embodiments. It is appreciated that the system 100 is provided for illustrative purposes and that suitable variations are contemplated.

The system 100 includes circuitry 102, light 104, camera 106, video 108, a reference measurement or reference 112 and an interface 110. The circuitry 102 includes one or more processors, a memory, and a network interface. The one or more processors are configured to perform functionality of the system 102. The network interface is configured to provide/receive data to/from a network via a transceiver.

The light 104 is configured to illuminate the device 114 and the reference 112 to facilitate image capture by the camera 106. The light 104 can emit light at only selected wavelengths, such as infra-red, ultraviolet and the like.

The device 114 in this example is a conveyor belt system. However, it is appreciated that other suitable devices can be measured. The device 114 has a plurality of components, such as belt, pulley, sprockets and the like which can be measured. In another example, the device 114 can be a drill press.

The reference 112 is a plurality of points proximate the device 114 and having a known measurement. For example, the reference 112 can be a 1 meter horizontal line having a beginning point and an end point. The reference 112 can be formed on the device 114, such as taped or painted on. In another example, the reference 112 is a separate object and is physically placed proximate the device 114.

The camera 106, also referred to as an imaging device, captures one or more images of the device 114 and the reference 112. The one or more images can be video 108 at a suitable framerate.

The camera 106 can be attached to the device in a suitable manner, such as attached to a frame. Alternatively, the camera/imaging device 106 can comprise a mobile phone or mobile device.

The interface 110 can include a display interface, an input interface and the like. In one example, the interface 110 is provided via a cellular/mobile phone screen. In another example, the interface 110 is connected to a keyboard and display monitor. In yet another example, the interface 110 is a touch sensitive screen comprising a glass insulator coated with indium tin oxide (ITO) or the like and the circuitry configured to select the one or more device points based on change in capacitance at one or more locations of the touch sensitive screen.

The interface 110 can also include a network interface configured to communicate wired or wirelessly with a remote device, such as a cloud database, cellular device and the like. The interface 110 can utilize suitable protocols such as WiFi, Bluetooth, and the like.

The circuitry 102 is configured to obtain one or more images of the device 114 and the reference 112 via the camera/imaging device 106. The circuitry 102 is further configured to designate or set the reference 112. The circuitry 102 is configured to identify and/or select two or more points for measurement. The circuitry 102 is configured to determine measurement(s) for the two or more points based on the reference 112 and the one or more images. The circuitry 102 is configured to determine system parameters and/or characteristics based on the determined measurements.

The circuitry 102 can comprise one or more processors.

Figure 2:
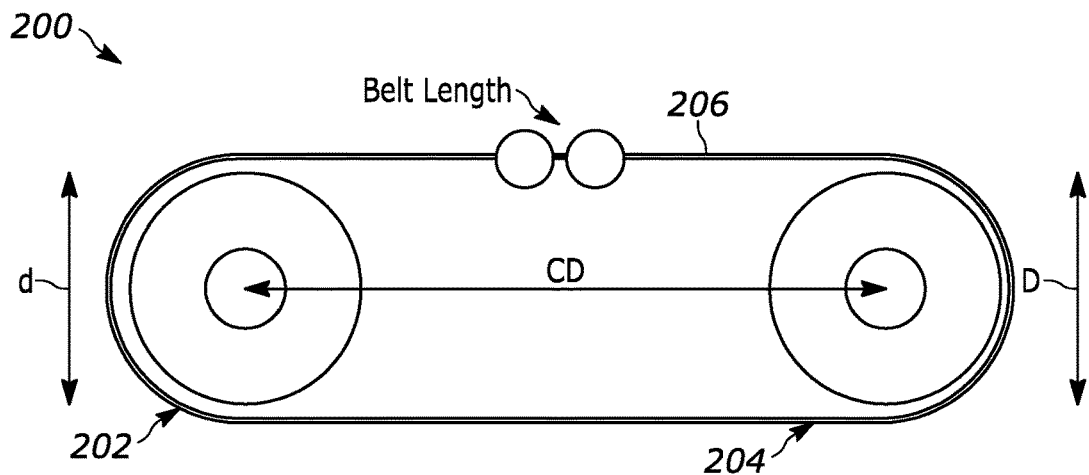
FIG. 2 is a diagram illustrating a device 200 for measurement by the system 100 in accordance with one or more embodiments.

FIG. 2 is a diagram illustrating a device 200 for measurement by the system 100 in accordance with one or more embodiments. The device 200 is provided for illustrative purposes and it is appreciated suitable variations are contemplated.

The device 200 is a conveyor belt system and can be the device 114 in the system 100.

The conveyor belt system 200 includes a conveyor belt 206 formed as an endless loop around a first pulley 202 and a second pulley 204.

The one or more points selected include center points for the first pulley 202 and the second pulley 204 and additional points on an upper surface of the belt 206 and additional points on a lower surface of the belt 206.

The reference 114 is not shown in FIG. 2, but is present.

Dimensions diameter d and diameter D are determined based on the one or more images.

In one example, the diameter d is 3.30 inches, D is 3.3 inches and the center diameter (CD) is 13 inches theoretically.

Measurements by the system 100 using one or more images yielded diameter d at 3.26 inches, D at 3.26 inches. The CD is determined to be 12.97 inches, substantially close to the actual or theoretical values of 13 inches.

Additional parameters/characteristics such as a belt length, a wrap angle, a belt tension, a belt life prediction and the like can be determined based on the measurements.

As stated above, the circuitry 502 of the system 402 synchronizes the video in a stroboscopic video (2). Rotational speed (strobe frequency setting) is adjusted or configured to obtain synchronization (3), such as a still image. The resulting rotational speed when synchronized is the measured rotational speed of the pulleys 102, 104. The system 402 determines (4) the measured rotational speed of the pulleys 102, 104 from the synchronized speed.

Figure 3:
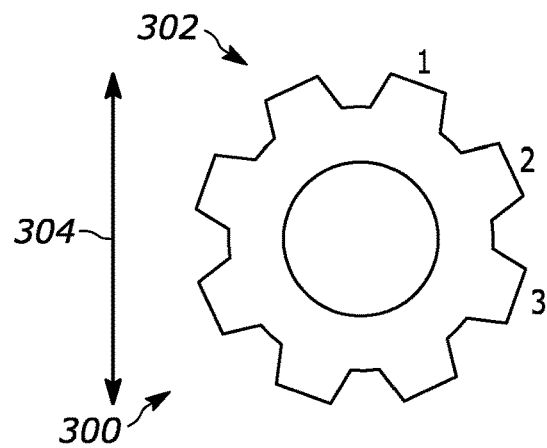
FIG. 3 is a diagram illustrating a sprocket 300 for measurement by the system 100 in accordance with one or more embodiments.

FIG. 3 is a diagram illustrating a sprocket 300 for measurement by the system 100 in accordance with one or more embodiments. The sprocket 300 is provided for illustrative purposes and it is appreciated suitable variations are contemplated.

The sprocket 300 is measured by the system 100 as the device 114.

One or more points on the sprocket 300 are selected to measure a diameter 304 of the sprocket 300.

The measured diameter 304 is then used to calculate a number of teeth 302 for the sprocket 300. Other parameters can be calculated and include belt drive parameters, belt tension, belt life prediction, sprocket identification and the like.

Figure 4:
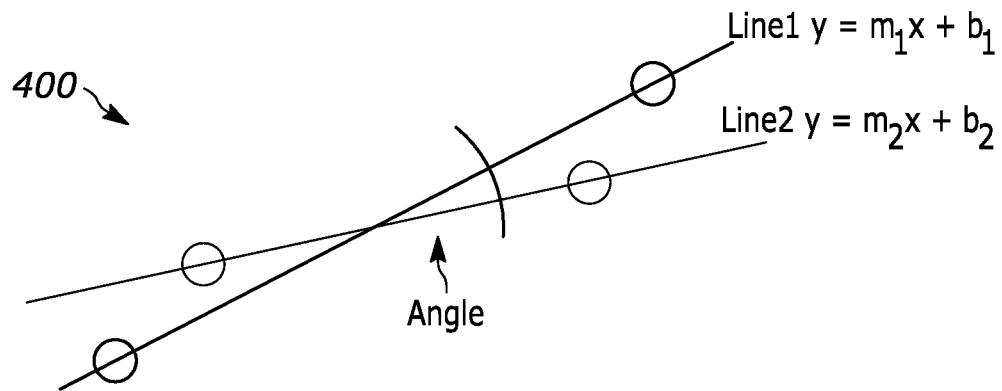
FIG. 4 is a diagram illustrating angle measurement 400 by the system 100 in accordance with one or more embodiments.

FIG. 4 is a diagram illustrating angle measurement 400 by the system 100 in accordance with one or more embodiments. The angle measurement 400 is provided for illustrative purposes and it is appreciated suitable variations are contemplated.

In this example, there are first selected points corresponding to Line1 and second selected points corresponding to Line2. Line1 is the location of a portion of the device 114, such as an edge. Line2 is the location of another portion of the device 114, such as a second edge.

The system 100 determines measurements for the first selected points and the second selected points. A slope m1 is determined for Line1 and a slope m2 is determined for Line2. Further, an angle between Line1 and Line2 is determined.

Figure 5:
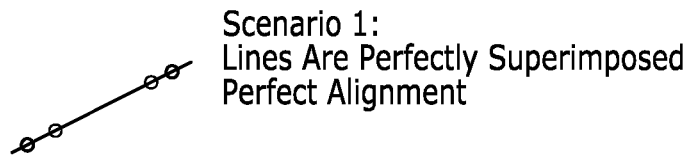
FIG. 5 is a diagram illustrating example alignment scenarios by the system 100 in accordance with one or more embodiments.
Figure 5:
Figure 5:

FIG. 5 is a diagram illustrating example alignment scenarios by the system 100 in accordance with one or more embodiments. The scenarios are provided for illustrative purposes and it is appreciated suitable variations are contemplated.

A first scenario (Scenario 1) shows where Line1 and Line2 are in perfect alignment.

A second scenario (Scenario 2) shows where Line1 and Line2 are parallel to each other, but have a linear misalignment.

A third scenario (Scenario 3) shows where Line1 and Line2 are crossing and may have angular misalignment.

Figure 6:
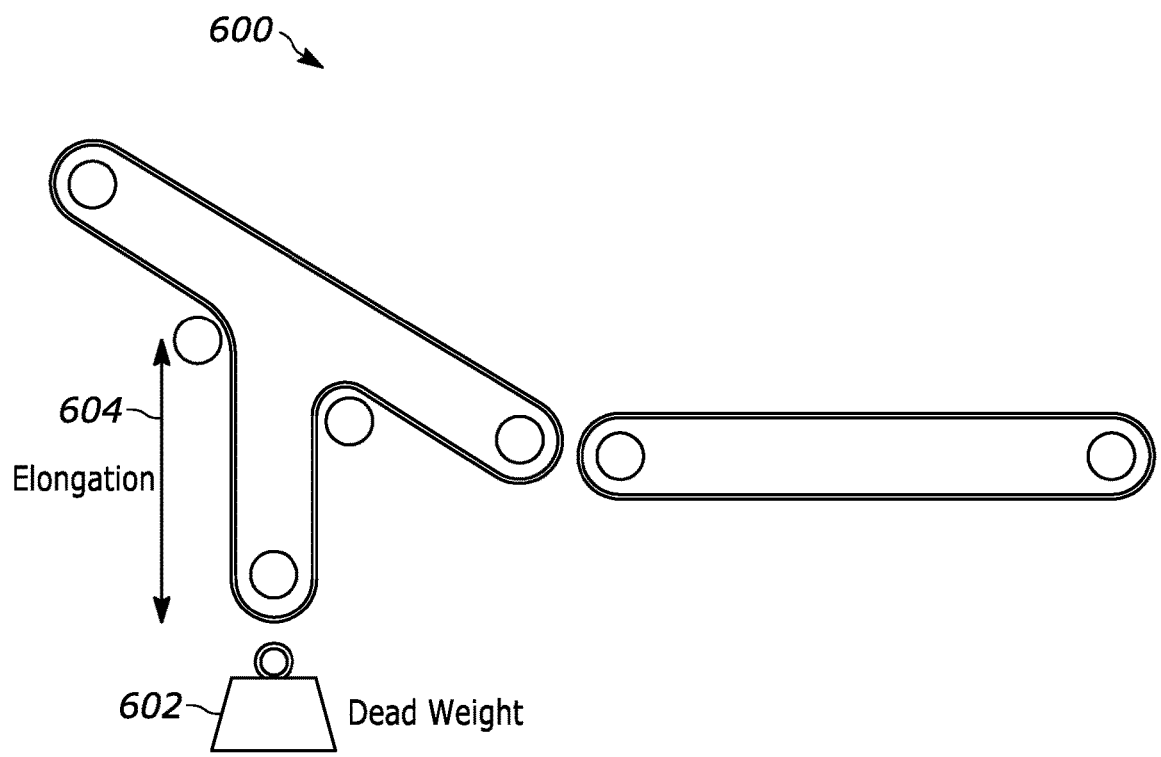
FIG. 6 is a diagram illustrating measuring elongation for a conveyor belt system in accordance with one or more embodiments.

FIG. 6 is a diagram illustrating measuring elongation for a conveyor belt system in accordance with one or more embodiments.

In this example, a dead weight 602 is attached to a portion of a conveyor belt system. Points are selected to measure a distance from a first pulley to the dead weight 602.

The measurement is determined and then used to calculate an elongation 604 for a belt of the conveyor belt system.

Figure 7:
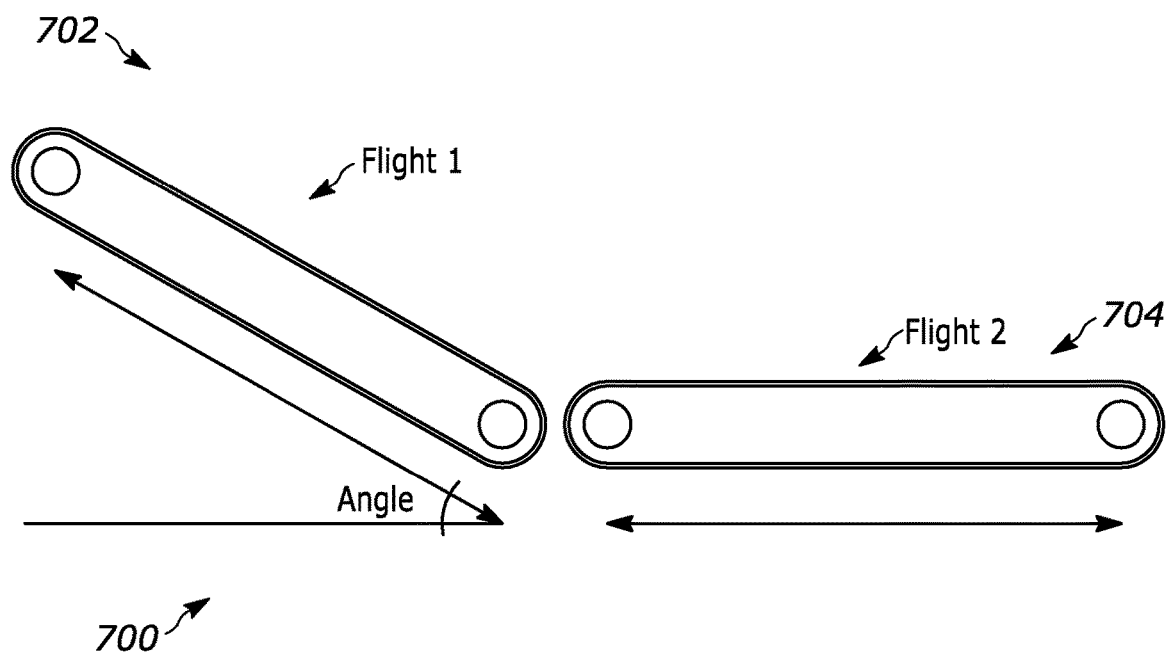
FIG. 7 is a diagram illustrating multiple belt system 700 measurements in accordance with one or more embodiment.

FIG. 7 is a diagram illustrating multiple belt system 700 measurements in accordance with one or more embodiment. It is appreciated the system 700 is provided for illustrative purposes and that suitable variations are contemplated.

This system 700 includes Flight 1 702 and Flight 2 704.

The Flight 2 704 is substantially horizontal whereas the Flight 1 702 has an angle as shown.

Points for each flight are selected to determine line characteristics as shown above.

The line measurements are then used to determine the angle between Flight 1 702 and Flight 2 704.

Figure 8:
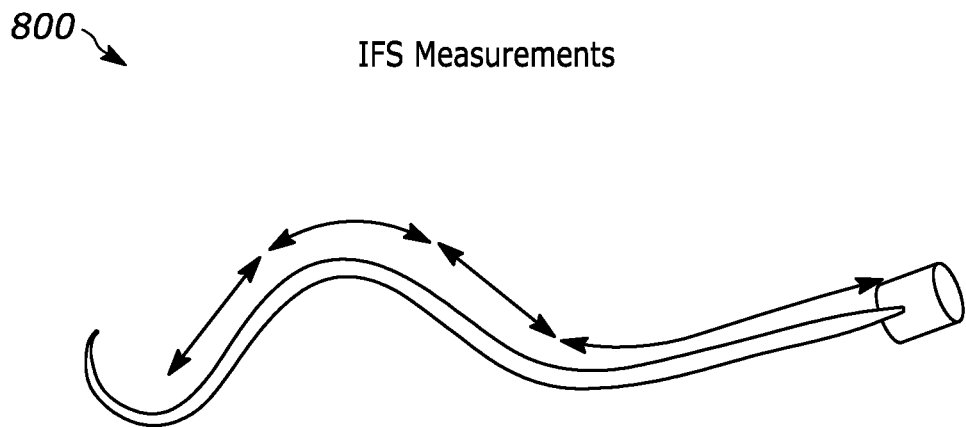
FIG. 8 is a diagram illustrating industrial fluid systems (IFS) 800 measurements in accordance with one or more embodiments.

FIG. 8 is a diagram illustrating industrial fluid systems (IFS) 800 measurements in accordance with one or more embodiments. It is appreciated the system 800 is provided for illustrative purposes and that suitable variations are contemplated.

Points for various segments of fluid or material flowing through a hose or channel are selected.

Measurements of the segments are obtained using the system 100.

Flow rates are then determined based on the measurements.

Figure 9:
FIG. 9 is a diagram illustrating example measurements for a closed system 900 in accordance with one or more embodiments.
Figure 9:
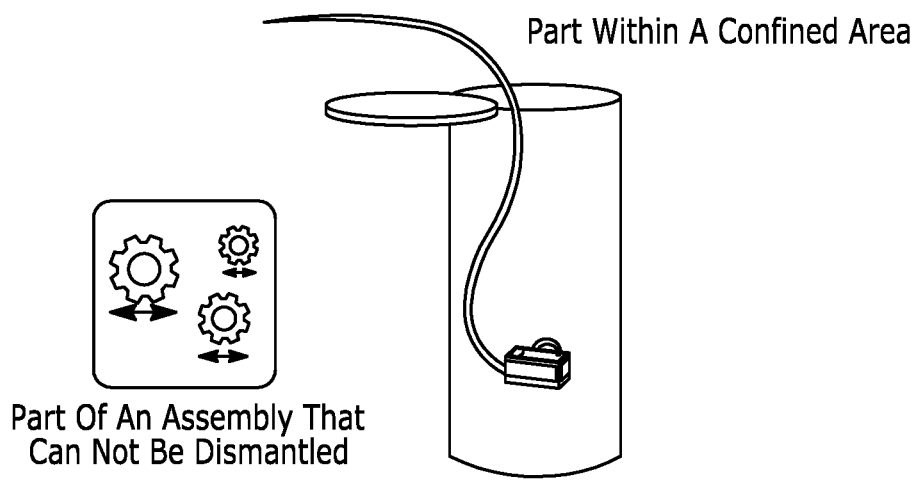

FIG. 9 is a diagram illustrating example measurements for a closed system 900 in accordance with one or more embodiments. It is appreciated the system 900 is provided for illustrative purposes and that suitable variations are contemplated.

In this example, the device 114 is a closed system where parts are not able to be viewed or accessed without device disassembly.

Instead of requiring disassembly, the light 104 and the camera 106 are positioned within the closed system. The camera 106 is configured to obtain the one or more images.

Points are selected corresponding to parts within the closed system and measurements are obtained using the system 100.

Figure 10:
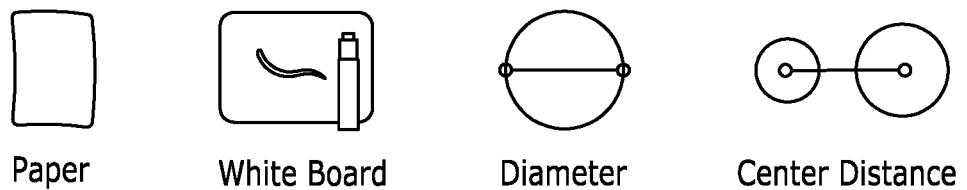
FIG. 10 is a diagram illustrating additional example measurements in accordance with one or more embodiments.

FIG. 10 is a diagram illustrating additional example measurements in accordance with one or more embodiments. It is appreciated the examples are provided for illustrative purposes and that suitable variations are contemplated.

The reference measurement 112 can be implemented as a piece of paper or a white board that is positioned proximate the device 114.

Two points on a circle can be selected to determine circle/device measurements such as diameter, radius, circumference, and the like.

Centers of circles (focus) are selected to determine measurements between sprockets, pulleys and the like.

Figure 11:
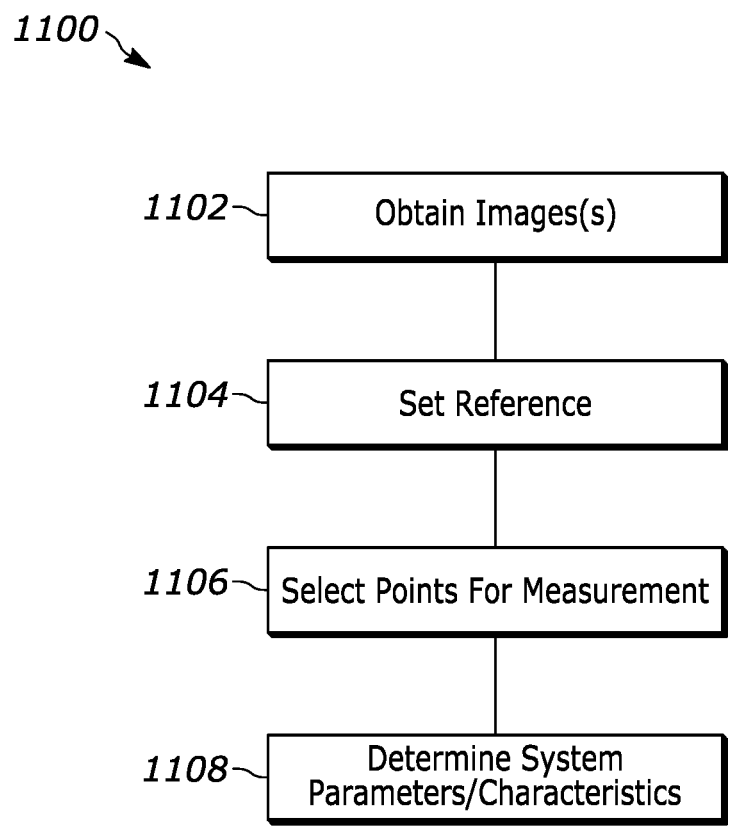
FIG. 11 is a flow diagram illustrating a method 1100 of determining device characteristics using images in accordance with one or more embodiments.

FIG. 11 is a flow diagram illustrating a method 1100 of determining device characteristics using images in accordance with one or more embodiments. It is appreciated the method 1100 is provided for illustrative purposes and that suitable variations are contemplated.

The method 1100 can be performed using the above system 100.

One or more images of a device 114 and reference measurements 112 are obtained at 1102.

The reference measurement 112 is set to a known value at 1104. For example, the reference measurement could be 12 inches or 80 centimeters.

Points of the device 114 are selected for measurement at 1106.

Measurements for the selected points are determined and system parameters/characteristics are determined based on the measurements at 108.

It is noted that 'having' does not exclude other elements or steps and 'one' or 'one' does not exclude a multitude. It should also be noted that characteristics described with reference to one of the above examples of execution can also be used in combination with other characteristics of other examples of execution described above. Reference signs in the claims are not to be regarded as a restriction.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the steps, blocks and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "adjacent", "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It should be added that 'having' does not exclude other elements or steps and 'one' or 'one' does not exclude a multitude. It should also be noted that characteristics described with reference to one of the above examples of execution can also be used in combination with other characteristics of other examples of execution described above. Reference signs in the claims are not to be regarded as a restriction.

Various examples are provided, however it is appreciated that suitable variations are contemplated.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus, system, and the like to perform the actions.

One general aspect includes a measurement system. The measurement system includes an imaging device configured to obtain a device image for a first device; the image device configured to obtain a reference image having a reference measurement. The system further including a memory device configured to store the device image; an interface; and circuitry having one or more processors. The processors are configured to: select one or more device points of the device image; determine a reference measurement for the reference dimension based on the reference image; determine one or more device measurements based on the device image, the selected device points and the reference measurement; and calculate one or more device parameters based on the determined one or more device measurements.

Implementations may include one or more of the following features. The system the first device being a conveyor belt system and may include a first pulley, a second pulley spaced from the first pulley and a conveyor belt wrapped around the first pulley and the second pulley, and a drive motor configured to controllably rotate the first pulley. The interface being a network interface and configured to facilitate selection of the one or more device points. The image device being may include within a mobile phone. The image device installed proximate a frame of a conveyor belt system. The reference dimension being marked on a material and having a known length. The one or more system parameters may include a number of sprocket teeth. The one or more system parameters may include one or more of a diameter, a center distance, an angle, and a dead weight belt elongation. The one or more system parameters may include linear misalignment and angular misalignment. The one or more system parameters may include an angle misalignment of a portion of the conveyor belt. The one or more processors are configured to select the one or more device points corresponding to a medium on the device image and on an additional device image having a time offset from the device image, determine the one or more device measurements at the time offset and determine a flow rate of the medium on the conveyor belt system. The one or more system parameters may include a center distance, a belt length, a wrap angle, a belt tension and a belt life prediction. The one or more system parameters may include a dead weight belt elongation. The image device configured to generate the system image using infra red wavelengths of about 50 to 1000 micrometers. The memory device further configured to store a plurality of previous device images. Implementations of the described techniques may include hardware, a method or process, or computer software on a computer-accessible medium. The one or more points can be selected via a touch sensitive screen, such as a capacitance based touch sensitive screen.

Another generate aspect is a measurement system that includes an imaging device and circuitry. The imaging device configured to obtain a device image for a conveyor belt system. The circuitry may include one or more processors configured to: select one or more device points of the device image based on user input; select a reference measurement for a reference dimension; determine one or more device measurements based on the device image, the selected device points and the reference measurement; and calculate one or more device parameters based on the determined one or more device measurements.

Implementations may include one or more of the following features. The user input received via a touch sensitive screen comprising a glass insulator coated with indium tin oxide (ITO) and the one or more processors are configured to select the one or more device points based on change in capacitance at one or more locations of the touch sensitive screen.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A measurement system comprising:
   an imaging device configured to obtain a device image for a first device;
   the imaging device configured to obtain a reference image having a reference measurement;
   a memory device configured to store the device image;
   an interface; and
   circuitry comprising one or more processors configured to:
   select one or more device points of the device image;
   determine a reference measurement for the reference dimension based on the reference image;
   determine one or more device measurements based on the device image, the selected device points and the reference measurement;
   calculate one or more device parameters based on the determined one or more device measurements; and
   the first device being a conveyor belt system and comprising a first pulley, a second pulley spaced from the first pulley and a conveyor belt wrapped around the first pulley and the second pulley, and a drive motor configured to controllably rotate the first pulley.

2. The system of claim 1, the interface being a network interface and configured to facilitate selection of the one or more device points.

3. The system of claim 1, the imaging device being comprised within a mobile phone.

4. The system of claim 1, the imaging device installed proximate a frame of a conveyor belt system.

5. The system of claim 1, the reference dimension marked on a material and having a known length.

6. The system of claim 1, the one or more system parameters comprising a number of sprocket teeth.

7. The system of claim 1, the one or more system parameters comprising one or more of a diameter, a center distance, an angle, and a dead weight belt elongation.

8. The system of claim 1, the one or more system parameters comprising linear misalignment and angular misalignment.

9. The system of claim 1, the one or more system parameters comprising an angle misalignment of a portion of the conveyor belt.

10. The system of claim 1, the one or more processors configured to select the one or more device points corresponding to a medium on the device image and on an additional device image having a time offset from the device image, determine the one or more device measurements at the time offset and determine a flow rate of the medium on the conveyor belt system.

11. The system of claim 1, the one or more system parameters comprising a center distance, a belt length, a wrap angle, a belt tension and a belt life prediction.

12. The system of claim 1, the one or more system parameters comprising a dead weight belt elongation.

13. The system of claim 1, the imaging device configured to generate the system image using infra red wavelengths of about 50 to 1000 micrometers.

14. The system of claim 1, the memory device further configured to store a plurality of previous device images.

15. The system of claim 1, the reference measurement being a twelve inch mark.

16. The system of claim 1, the one or more device points being selected using a touch sensitive screen.

17. A measurement system comprising:
an imaging device configured to obtain a device image for a first device;
the imaging device configured to obtain a reference image having a reference measurement;
a memory device configured to store the device image;
an interface; and
circuitry comprising one or more processors configured to:
select one or more device points of the device image;
determine a reference measurement for the reference dimension based on the reference image;
determine one or more device measurements based on the device image, the selected device points and the reference measurement;
calculate one or more device parameters based on the determined one or more device measurements; and
the first device comprising an industrial fluid hose and the one or more parameters comprising a medium flow rate through the industrial fluid hose.

18. A measurement system comprising:
an imaging device configured to obtain a device image for a conveyor belt system; and
circuitry comprising one or more processors configured to:
select one or more device points of the device image based on user input;
select a reference measurement for a reference dimension;
determine one or more device measurements based on the device image, the selected device points and the reference measurement;
calculate one or more device parameters based on the determined one or more device measurements; and
the user input via a touch sensitive screen comprising a glass insulator coated with indium tin oxide (ITO) and the one or more processors are configured to select the one or more device points based on change in capacitance at one or more locations of the touch sensitive screen.

* * * * *